United States Patent
Masuda

(10) Patent No.: US 11,132,099 B2
(45) Date of Patent: Sep. 28, 2021

(54) INFORMATION PROCESSING DEVICE AND INFORMATION PROCESSING METHOD

(71) Applicant: Sony Corporation, Tokyo (JP)

(72) Inventor: Tooru Masuda, Tokyo (JP)

(73) Assignee: Sony Corporation

( * ) Notice: Subject to any disclaimer, the term of this patent is extended or adjusted under 35 U.S.C. 154(b) by 81 days.

(21) Appl. No.: 15/750,953

(22) PCT Filed: Jun. 10, 2016

(86) PCT No.: PCT/JP2016/067432
§ 371 (c)(1),
(2) Date: Feb. 7, 2018

(87) PCT Pub. No.: WO2017/047173
PCT Pub. Date: Mar. 23, 2017

(65) Prior Publication Data
US 2018/0232108 A1    Aug. 16, 2018

(30) Foreign Application Priority Data

Sep. 14, 2015 (JP) ............................. JP2015-181090

(51) Int. Cl.
*G06F 3/0481* (2013.01)
*H04N 21/431* (2011.01)
(Continued)

(52) U.S. Cl.
CPC ........... *G06F 3/0481* (2013.01); *H04N 5/272* (2013.01); *H04N 5/45* (2013.01);
(Continued)

(58) Field of Classification Search
CPC ........ G06F 3/0481; H04N 5/272; H04N 5/45; H04N 21/21805; H04N 21/414; H04N 21/431; H04N 21/472; H04N 21/816
See application file for complete search history.

(56) References Cited

U.S. PATENT DOCUMENTS

2009/0160851 A1* 6/2009 Chan ...................... A63F 13/12
                                                  345/419
2013/0135315 A1* 5/2013 Bares ................... G11B 27/031
                                                  345/473
(Continued)

FOREIGN PATENT DOCUMENTS

JP         08-191419        7/1996
JP        2005192057 A      7/2005
(Continued)

OTHER PUBLICATIONS

Screen Captures from Youtube, "Portal Video Game," uploaded on Jul. 19, 2006. Retrieved from Internet: <https://www.youtube.com/watch?v=GsfUZE7Zm_4> (Year: 2006).*

(Continued)

*Primary Examiner* — Andrew T Chiusano
(74) *Attorney, Agent, or Firm* — Lerner, David, Littenberg, Krumholz & Mentlik, LLP

(57) ABSTRACT

Display of free viewpoint video content is switched so as to alleviate health hazard to viewers without impairing the reality.

The omni window is a window integrating all windows, through each of which each sub-content is looked in from main content, and also serves as an entrance to a free viewpoint space of each sub-content. A viewer can go back and forth between different free viewpoint spaces by way of the omni window and the free viewpoint video is switched in accordance with such an exploring motion within the spaces. Furthermore, it is possible to impart a conversion function for a perceived size of the viewer to the omni window.

13 Claims, 18 Drawing Sheets

(51) Int. Cl.
    *H04N 21/472*     (2011.01)
    *H04N 21/414*     (2011.01)
    *H04N 21/81*     (2011.01)
    *H04N 21/218*     (2011.01)
    *H04N 5/272*     (2006.01)
    *H04N 5/45*     (2011.01)

(52) U.S. Cl.
    CPC ..... *H04N 21/21805* (2013.01); *H04N 21/414* (2013.01); *H04N 21/431* (2013.01); *H04N 21/472* (2013.01); *H04N 21/816* (2013.01)

(56) References Cited

U.S. PATENT DOCUMENTS

| | | | |
|---|---|---|---|
| 2014/0186002 A1 | 7/2014 | Hanaya et al. | |
| 2015/0193446 A1* | 7/2015 | Barnett | G06F 16/444 |
| | | | 715/234 |
| 2015/0234547 A1* | 8/2015 | Barnett | G06F 3/04815 |
| | | | 715/768 |
| 2017/0169540 A1* | 6/2017 | Satori | H04N 21/2187 |
| 2017/0228922 A1* | 8/2017 | Kaeser | A63F 13/5255 |

FOREIGN PATENT DOCUMENTS

| | | |
|---|---|---|
| JP | 2007208340 A | 8/2007 |
| JP | 2013225042 A | 10/2013 |
| JP | 2014127987 A | 7/2014 |
| JP | 2014240961 A | 12/2014 |
| JP | 5777185 B1 | 9/2015 |

OTHER PUBLICATIONS

International Search Report for PCT/JP2016/067432, dated Sep. 13, 2016; 3 pgs.

* cited by examiner

FIG. 5
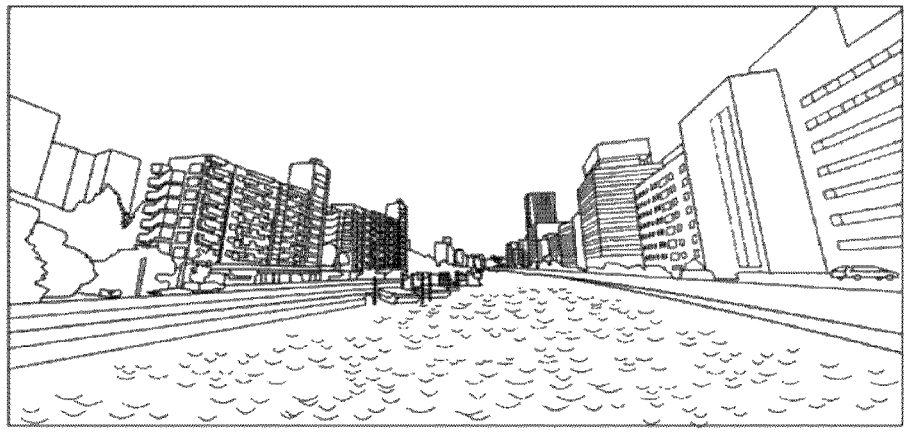
(A)
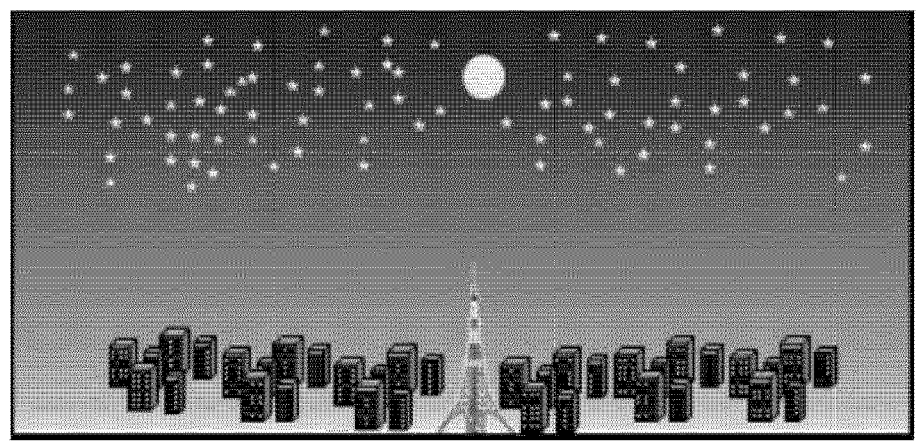
(B)
(C)

FIG. 20

FILTERING CONDITIONS AT TIME OF SELECTING SUB-CONTENT (1) FILTER ACCORDING TO INFORMATION WITHIN SCREEN
 - INCLUDE OR DOES NOT INCLUDE CERTAIN FEATURE POINT/OBJECT
  (EXAMPLE: FACE OF MEMBER A IN IDOL GROUP) IN SCREEN (2) FILTER ACCORDING TO VIEWER
 - USE OWN LOG OF VIEWER/USE LOG OF SOMEONE OTHER THAN VIEWER
 - FILTER ACCORDING TO ATTRIBUTE
  - FRIENDS, ACQUAINTANCES, ACCOMPANYING PEOPLE (SOCIAL GRAPH)/EXPERTS
  - VIEWING HISTORY SUCH AS VIEWING SIMILAR WORKS
  - VIEWING LOGS IN CURRENT WORK (TENDENCY TO WATCH SAME OBJECT)
  - OTHERS, PROFILE INFORMATION SUCH AS AGE AND SEX (3) FILTER ACCORDING TO VIEWING SITUATION
 - VIEWING TIME SLOT
 - LOCATION/AREA
 - VIEWING DEVICE
  - CLASSIFICATION (HMD, SMARTPHONE, TV, ETC.), SIZE

INFORMATION PROCESSING DEVICE AND INFORMATION PROCESSING METHOD

CROSS-REFERENCE TO RELATED APPLICATIONS

This application is a national phase entry under 35 U.S.C. § 371 of International Application No. PCT/JP2016/067432 filed Jun. 10, 2016, which claims the priority from Japanese Patent Application No. 2015-181090, filed in the Japanese Patent Office on Sep. 14, 2015, the entire contents which are hereby incorporated by reference.

TECHNICAL FIELD

The technology disclosed in the present description relates to an information processing device and an information processing method that control display of content and more particularly to an information processing device and an information processing method that switch display of free viewpoint video content.

BACKGROUND ART

Research and development on a free viewpoint video technology that allows a viewer to freely select a viewpoint position and a line-of-sight direction is proceeding. For example, entertainment videos such as sports and concert broadcasts, intangible cultural properties and educational content, and the like can be cited as the main application fields of the free viewpoint video technology. Recently, the free viewpoint video technology has begun to be applied to services that virtually visit a real space.

A free viewpoint video can be viewed using, for example, a head-mounted display used by a viewer wearing it on his/her head. By displaying the free viewpoint video while changing the viewpoint position and the line-of-sight direction on the basis of a result of detecting a motion of the head of the viewer, experience as if the viewer is actually exploring a virtual space being projected can be presented to the viewer.

For example, a head-worn type display system provided with an image pickup system that picks up a wide-angle image having a wider angle than a display image actually displayed has been proposed, in which a display image to be watched by a user is cut out to be displayed on the basis of position information on the head of the user detected by a rotation angle sensor (for example, refer to Patent Document 1). Meanwhile, there has been proposed a head-mounted display that detects a change in posture of the head of a user with a gyroscope or the like and calculates the amount of movement of a video to be displayed (for example, refer to Patent Document 2).

In the future, as the use of the free viewpoint video technology expands, it is expected that numerous pieces of free viewpoint video content are provided and the opportunity to switch to another free viewpoint video while viewing a free viewpoint video also increases.

In a TV receiver, in general, a program displayed on a screen is switched in accordance with the operation of a channel button of a remote controller or the like. However, if the free viewpoint video is instantly switched, a viewing field of the viewer will change as a whole and the visual stimulus will be too strong. Sharp changes in visual environment such as light and dark can cause health hazard to viewers.

In addition, in a technological field of content, technology for switching display content is widely adopted. For example, a proposal has been made on a device that expresses viewable moving picture content with a plurality of thumbnails and reproduces a clicked one of the moving picture content (for example, refer to Patent Document 3).

Also in the free viewpoint video, it is possible to switch content by a similar technique. However, when thumbnails of other content are displayed while the free viewpoint video is virtually experienced on the head-mounted display or the like, the reality is hindered. In addition, if the free viewpoint video is instantly switched in accordance with the selection of a thumbnail, the visual environment changes sharply and there is concern about health hazard to viewers (the same as above). As an additional remark, there is also an issue that it is necessary to designate which viewpoint position and line-of-sight direction, and reproduction time are used to view a video when display is switched to another free viewpoint video.

CITATION LIST

Patent Document

Patent Document 1: Japanese Patent Application Laid-Open No. 8-191419
Patent Document 2: Japanese Patent Application Laid-Open No. 2013-225042
Patent Document 3: Japanese Patent Application Laid-Open No. 2007-208340

SUMMARY OF THE INVENTION

Problems to be Solved by the Invention

An object of the technology disclosed in the present description is to provide an excellent information processing device and information processing method capable of appropriately controlling display of free viewpoint video content.

Solutions to Problems

The technology disclosed in the present description is made in consideration of the above problems and a first aspect thereof is an information processing device including:

an omni window display control unit that controls display of an omni window through which sub-content is looked in from a free viewpoint space of main content currently being displayed; and a content switching unit that switches the sub-content to the main content in response to a motion of a viewer passing through the omni window within the free viewpoint space.

According to a second aspect of the technology disclosed in the present description, the information processing device according to the first aspect further includes a sub-content searching unit that selects the sub-content as a candidate for a display switching destination from the main content currently being displayed.

According to a third aspect of the technology disclosed in the present description, the sub-content searching unit of the information processing device according to the second aspect is configured to select the sub-content using at least one of a filter according to information within a screen, a filter according to a viewer, and a filter according to a viewing situation of the main content as a filtering condition.

According to a fourth aspect of the technology disclosed in the present description, the information processing device according to the first aspect further includes a within-sub-content display position determination unit that determines a viewpoint position and a line-of-sight direction, and reproduction time within the sub-content of a display switching destination.

According to a fifth aspect of the technology disclosed in the present description, the information processing device according to the first aspect further includes an omni window display position determination unit that determines a position and a size of the omni window to be displayed on the main content.

According to a sixth aspect of the technology disclosed in the present description, the omni window display control unit of the information processing device according to the fifth aspect is configured to arrange the omni window within the free viewpoint space of the main content with a display position and a display size determined by the omni window display position determination unit and display a free viewpoint video of the sub-content watchable while being looked in through a window in the omni window.

According to a seventh aspect of the technology disclosed in the present description, the information processing device according to the first aspect further includes an omni window display update unit that updates display of the omni window in line with a movement of a viewer within the free viewpoint space of the main content.

According to an eighth aspect of the technology disclosed in the present description, the content switching unit of the information processing device according to the first aspect is configured to convert a perceived size of a viewer when switching the sub-content to the main content.

In addition, a ninth aspect of the technology disclosed in the present description is an information processing method including:

an omni window display step of displaying an omni window through which sub-content is looked in from a free viewpoint space of main content currently being displayed; and a content switching step of switching the sub-content to the main content in response to a motion of a viewer passing through the omni window within the free viewpoint space.

Effects of the Invention

According to the technology disclosed in the present description, an excellent information processing device and information processing method capable of appropriately controlling display of free viewpoint video content can be provided.

Note that the effects described in the present description merely serve as examples and the effects of the present invention are not construed to be limited thereto. An additional effect other than the aforementioned effects can be further obtained as well in the present invention.

Still another object, feature, and advantage of the technology to be disclosed in the present description will be made clear through more detailed description based on the embodiments mentioned below and the accompanying drawings.

BRIEF DESCRIPTION OF DRAWINGS

FIG. 5 is a diagram exemplifying free viewpoint video content.

FIG. 20 is a diagram summarizing filtering conditions at the time of selecting the sub-content.

MODE FOR CARRYING OUT THE INVENTION

Hereinafter, embodiments of the technology to be disclosed in the present description will be described in detail with reference to the drawings.

Figure 1:
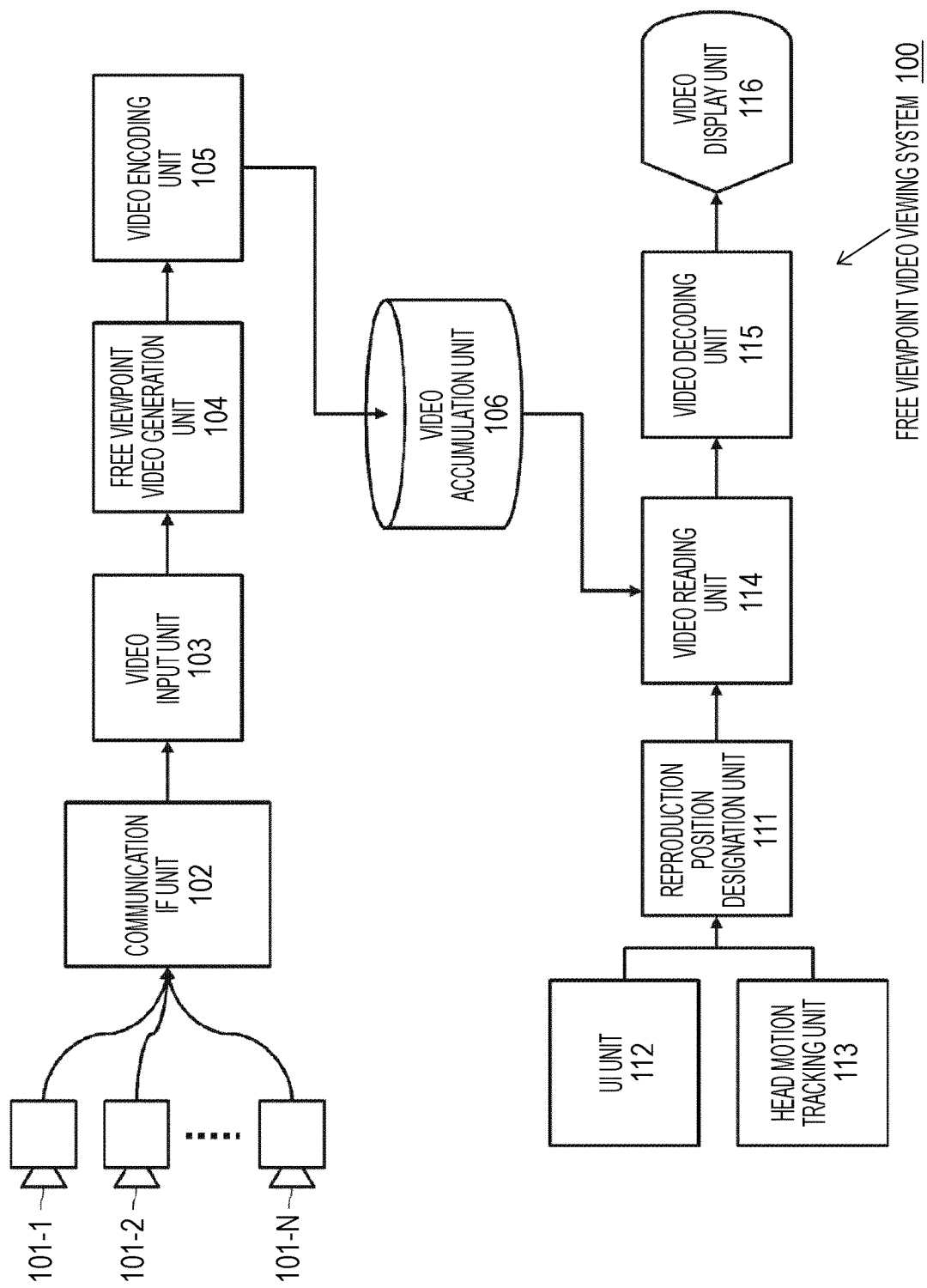
FIG. 1 is a diagram schematically illustrating a configuration example of a free viewpoint video viewing system 100.

FIG. 1 schematically illustrates a configuration example of a free viewpoint video viewing system 100. A free viewpoint video is generated on the basis of videos from multiple viewpoints having different viewpoint positions and line-of-sight directions. In order to obtain a high realistic feeling, the free viewpoint video is produced using a live-action video obtained by shooting the real world with a camera. In addition, in order to obtain a high-quality free viewpoint video, it is necessary to shoot a scene with a close camera interval. However, in reality, the number of cameras is finite and the camera interval also has a restriction on the size of devices. Therefore, it is common to generate videos from a viewpoint position and in a line-of-sight direction not shot by the camera using a viewpoint video interpolation technology. The illustrated free viewpoint video viewing system 100 generates a free viewpoint video from multiple-viewpoint videos acquired from a large number (assumed as N units) of cameras 101-1, 101-2, . . . , and 101-N that shoot the real world by the viewpoint video interpolation technology and outputs a video from viewpoint position and in a line-of-sight direction desired by a viewer to display.

The respective cameras 101-1, 101-2, . . . , and 101-N may be cameras placed on moving objects such as vehicles and flying objects (including unmanned aerial vehicles capable of remote operation) and digital cameras carried with individuals, in addition to fixed-point cameras. Alternatively, at least a part of the cameras 101-1, 101-2, . . . , and 101-N may be a camera attached to a head-mounted display to shoot the outside.

A video input unit 103 accepts the input of videos shot by the respective cameras 101-1, 101-2, . . . , and 101-N installed at remote locations via a communication interface (IF) unit 102 together with shooting position information such as the viewpoint positions and the line-of-sight directions and shooting time. Then, a free viewpoint video generation unit 104 performs viewpoint interpolation on the videos shot by the respective cameras 101-1, 101-2, . . . , and 101-N by the viewpoint video interpolation technology while synchronizing the shooting time to generate the free viewpoint video. However, the technology disclosed in the present description is not limited to a specific viewpoint video interpolation technology.

A video encoding unit 105 encodes and compresses the free viewpoint video generated by the free viewpoint video generation unit 104 to accumulate in a video accumulation unit 106. The video accumulation unit 106 is constituted by a mass storage device such as a hard disk.

A reproduction position designation unit 111 designates a reproduction position, specifically the viewpoint position and the line-of-sight direction, as well as the shooting time of the free viewpoint video to be viewed by the viewer. The reproduction position designation unit 111 designates reproduction position information, for example, through a viewer's operation on a user interface (UI) unit 112 or audio input from the viewer. Alternatively, the reproduction position designation unit 111 designates the viewpoint position and the line-of-sight direction of a reproduced video on the basis of a detection result of a head motion tracking unit 112 that tracks the position and the posture of the viewer's head.

A video reading unit 114 reads the free viewpoint video corresponding to the viewpoint position and the line-of-sight direction, and the time designated by the reproduction position designation unit 111 from the video accumulation unit 106. A video decoding unit 115 decodes a compressed video read from the video accumulation unit 106 and a video display unit 116 outputs the decoded video to display.

Figure 2:
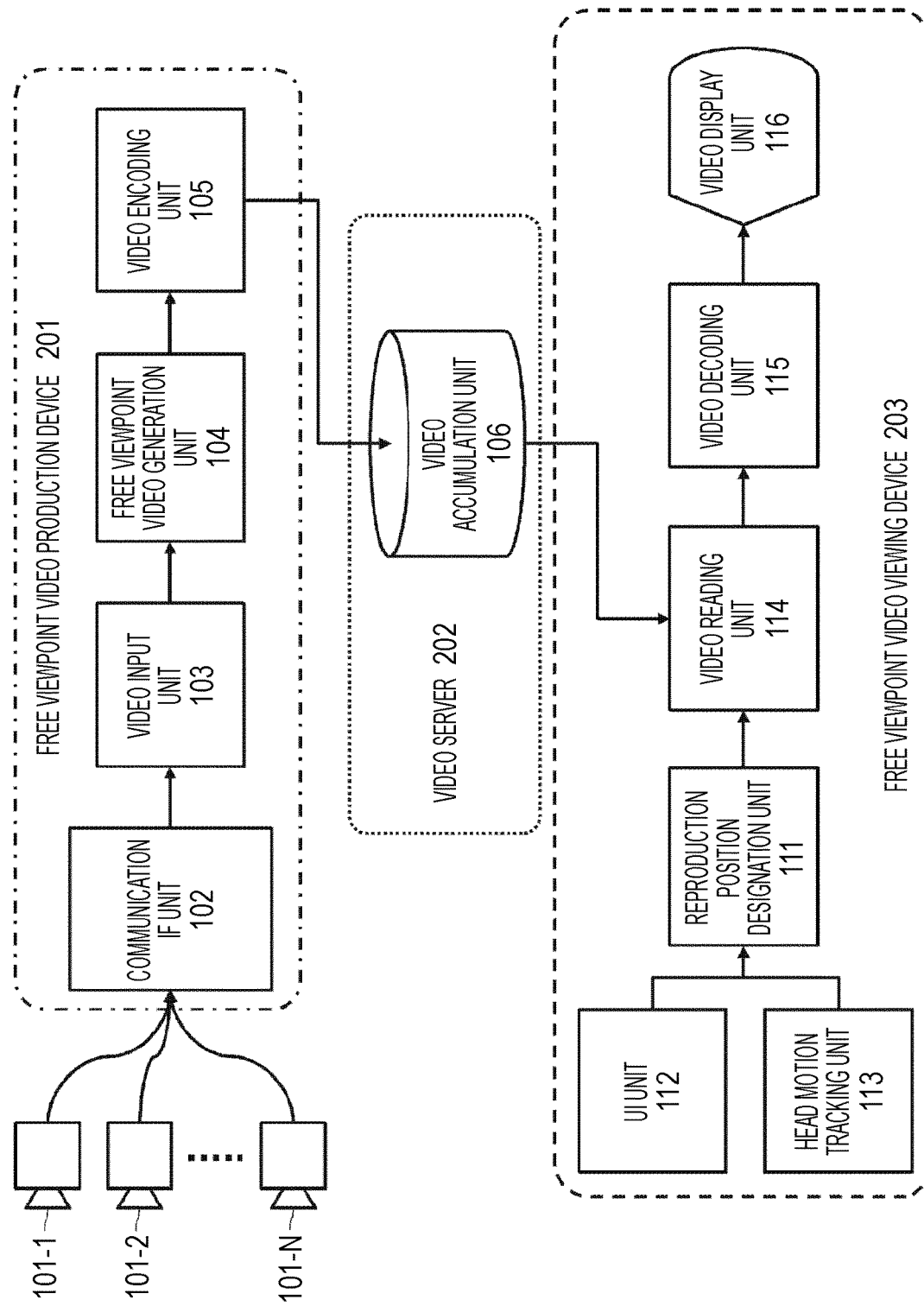
FIG. 2 is a diagram illustrating a configuration example of the free viewpoint video viewing system 100.

The free viewpoint video viewing system 100 is configured as a single device but additionally, a case where the free viewpoint video viewing system 100 is constituted by a combination of devices of three categories, namely, a free viewpoint video production device 201, a video server 202, and a free viewpoint video viewing device 203 is also presumed as illustrated in FIG. 2.

Figure 3:
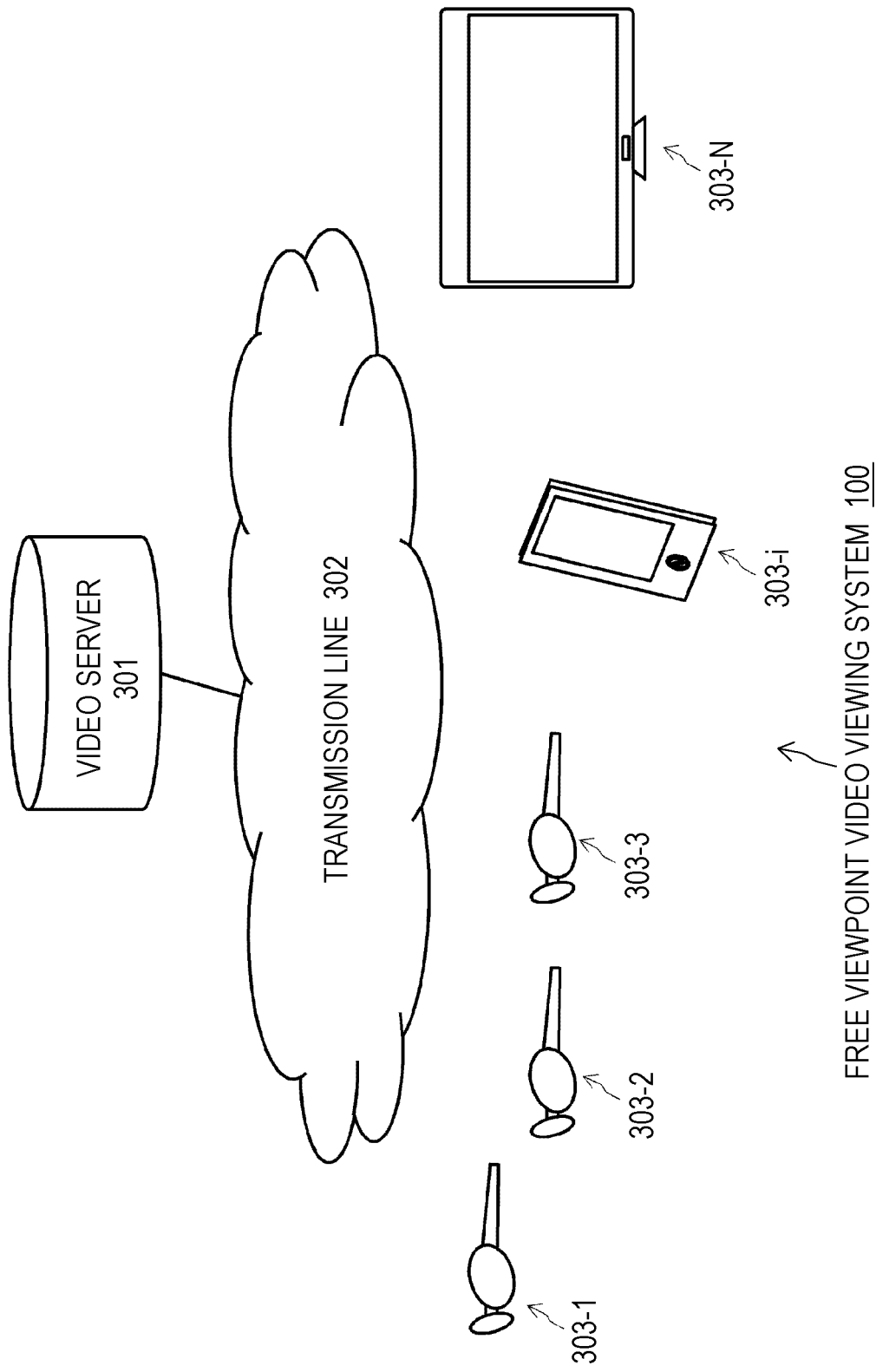
FIG. 3 is a diagram illustrating a configuration example of the free viewpoint video viewing system 100.

In addition, in actual management, numerous pieces of the free viewpoint video content produced by one or a plurality of video production companies are saved in a video server 301, as illustrated in FIG. 3, such that the pieces of the free viewpoint video content are distributed from the video server 301 to free viewpoint video viewing devices 303-1, 303-2, . . . , and 303-N of the respective viewers via a transmission line 302 such as a communication transmission line and a broadcast transmission line. The free viewpoint video viewing devices 303-1, . . . include a head-mounted display worn by a viewer on his/her head, a multifunctional information terminal such as a smartphone, a game machine, a monitor/display of a TV receiver or the like, and a projector.

The free viewpoint video content of various genres including entertainment such as sports and concert broadcasts, intangible cultural properties, and education is saved in the video server 202 or 301.

Figure 4:
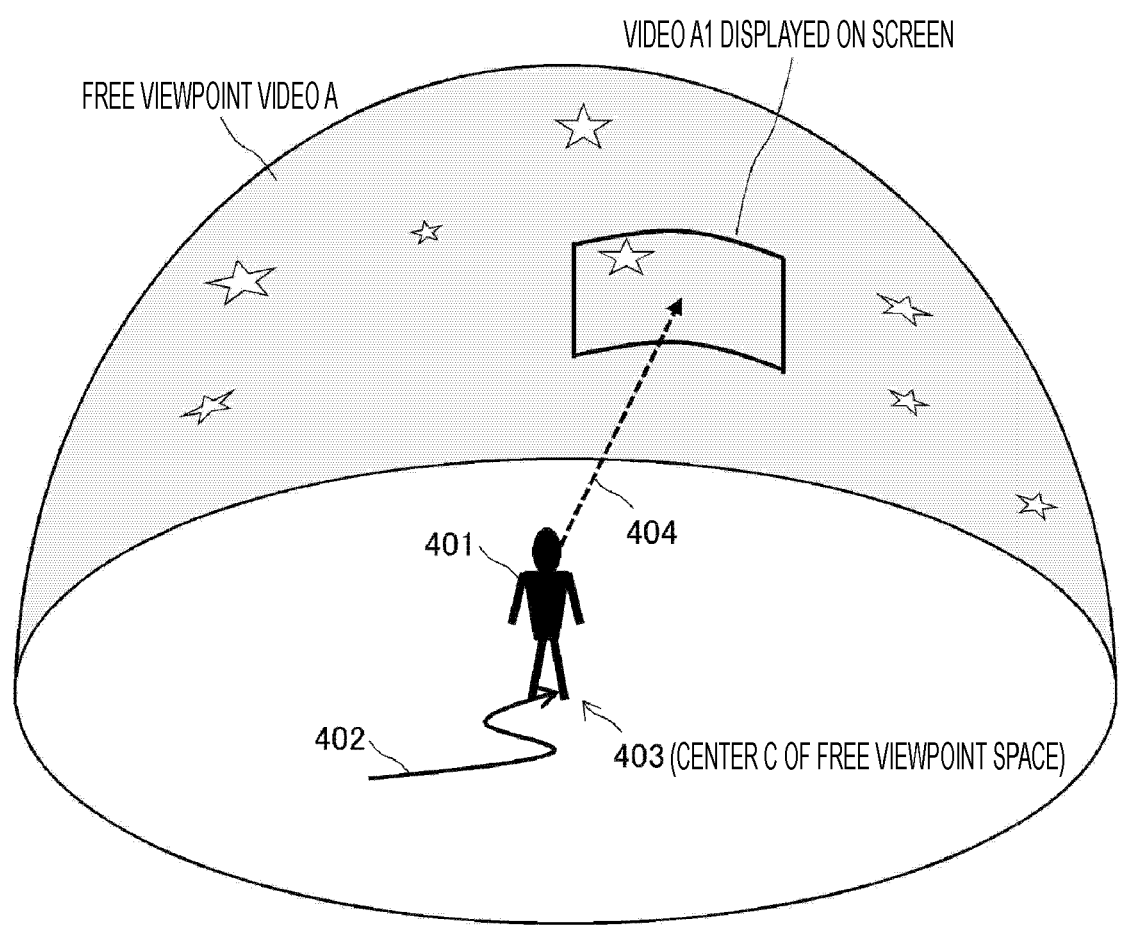
FIG. 4 is a diagram for explaining a mechanism for viewing a free viewpoint video.

The free viewpoint video is a video that the viewer can view while freely moving the viewpoint position and the line-of-sight direction. FIG. 4 briefly illustrates a mechanism for viewing a free viewpoint video A. It is assumed that a viewer 401 is moving the viewpoint position on a path indicated by reference numeral 402. A current viewpoint position designated by the viewer 401 is always arranged at a center C of a free viewpoint space such that a video A1 in a field of view visible in a line-of-sight direction 404 from a viewpoint position 403 at the center C is displayed on a screen. Then, when the viewer 401 alters the viewpoint position and the line-of-sight direction, a video to be displayed on the screen also changes following this alteration.

Recently, numerous pieces of the free viewpoint video content are being provided through a variety of media such as the Internet. It is also presumed that the viewer wants to switch to another free viewpoint video while viewing a certain free viewpoint video.

In a TV receiver, in general, a program displayed on a screen is switched in accordance with the operation of a channel button of a remote controller or the like. However, if the free viewpoint video is instantly switched, a viewing field of the viewer will change as a whole and the visual stimulus will be too strong. Sharp changes in visual environment such as light and dark can cause health hazard to viewers.

In addition, in a technological field of content, technology for switching display content is widely adopted. For example, a proposal has been made on a device that expresses viewable moving picture content with a plurality of thumbnails and reproduces a clicked one of the moving picture content (for example, refer to Patent Document 3). However, if the content is switched by a similar technique also in the free viewpoint video, the reality of the free viewpoint video is hindered by display of the thumbnails. Additionally, if the free viewpoint video is instantly switched in accordance with the selection of a thumbnail, the visual environment changes sharply and there is concern about health hazard to viewers. Furthermore, it is necessary to designate which viewpoint position and line-of-sight direction, and reproduction time are used to view a video when display is switched to another free viewpoint video.

Therefore, as a technology for switching the display of the free viewpoint video content so as to alleviate health hazard to viewers without impairing the reality, the present description proposes an "omni window" that integrates windows through which the viewer looks into every other free viewpoint space from the free viewpoint space where the viewer is currently present (that is, the free viewpoint video currently being viewed or displayed) (or by which the free viewpoint space where the viewer is currently present is separated from other free viewpoint spaces). The viewer can go back and forth between different free viewpoint spaces by way of the omni window and the free viewpoint video is switched in accordance with such an exploring motion within the spaces.

Although it is presumed that there are countless pieces of the free viewpoint video content viewable in the free viewpoint video viewing system 100, for the sake of simplicity, explanation will be given here on display switching operation for the content using the omni window between three types of content illustrated in FIGS. 5(A) to 5(C).

Figure 6:
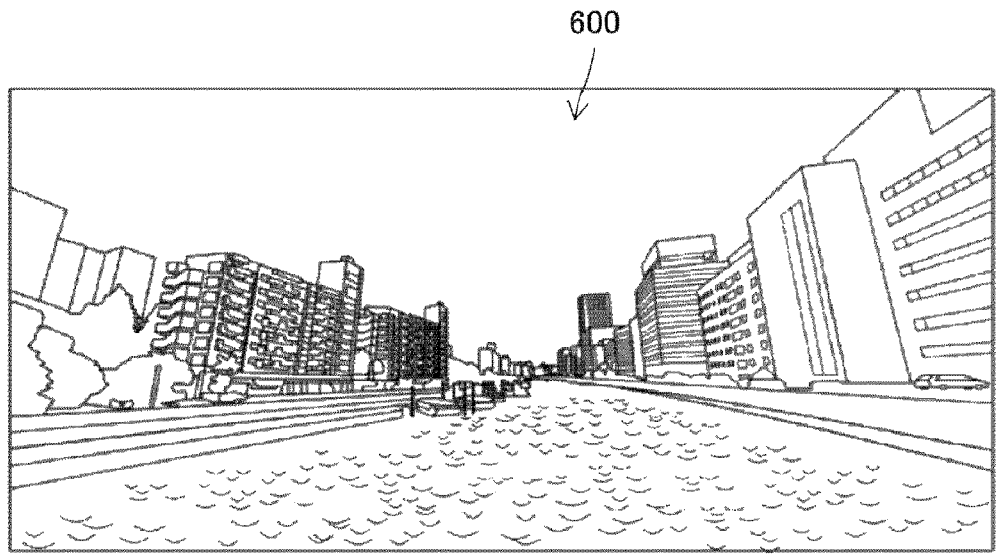
FIG. 6 is a diagram illustrating a state in which main content is displayed on a free viewpoint video viewing device 203.

First, it is assumed that, as illustrated in FIG. 6, the free viewpoint video associated with FIG. 5(A) is displayed in the free viewpoint video viewing device 203 as main content 600. When switching to another free viewpoint video is instructed from the viewer during the display of the main content 600, the free viewpoint video viewing device 203 executes a search for sub-content as candidates for a switching destination.

Here, it is assumed that two types of the free viewpoint video content in FIGS. 5(B) and 5(C) are found as the sub-content. The free viewpoint video viewing device 203 determines, for each sub-content, the reproduction position within the sub-content, that is, the viewpoint position and the line-of-sight direction, and the reproduction time in a case where the display is switched from the main content on the basis of a predetermined algorithm (described later).

Then, once the display position and the display size of the omni window id determined, the free viewpoint video viewing device 203 displays the omni window with the determined display position and size within the main content being displayed.

Figure 7:
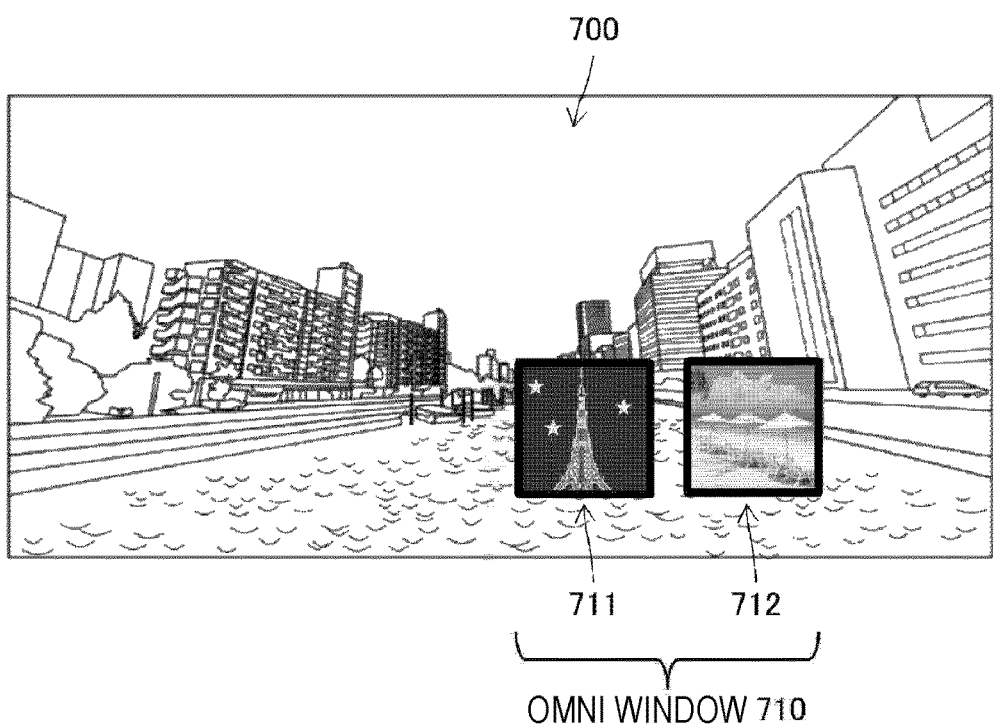
FIG. 7 is a diagram illustrating an example in which an omni window 710 is displayed within main content 700.

The omni window is a window integrating all windows, through each of which each sub-content is looked in from the main content. FIG. 7 illustrates an example in which an omni window 710 is displayed within main content 700. It is assumed that the main content 700 is the free viewpoint video associated with FIG. 5(A). Meanwhile, it is assumed that the sub-content is the two types of free viewpoint videos in FIGS. 5(B) and 5(C). The omni window 710 is made up of one or more windows 711 and 712 through which each sub-content assigned as candidates for a display switching destination from the main content 700 is looked in. Each of the windows 711 and 712 also serves as an entrance to the free viewpoint space of each sub-content. Note that, although FIG. 7 illustrates an example in which two pieces of the sub-content are found and the two windows 711 and 712 are displayed, in a case where three or more pieces of the sub-content as candidates for the switching destination are found, the omni window is constituted by three or more windows through which each sub-content is looked in.

The free viewpoint space of each sub-content is arranged behind the free viewpoint space of the main content. Each of the windows 711 and 712 displays a scenery when the free viewpoint space of each sub-content arranged behind is seen from the determined reproduction position described above (that is, viewpoint position and line-of-sight direction, and the reproduction time).

The viewer can observe the video of the sub-content as a candidate for the switching destination in the sense of seeing the scenery in another free viewpoint space through each of the windows 711 and 712. Accordingly, the omni window is a window opened to look in the sub-content arranged behind the main content and is different from a thumbnail of the sub-content simply pasted on a display screen of the main content 700.

Figure 8:
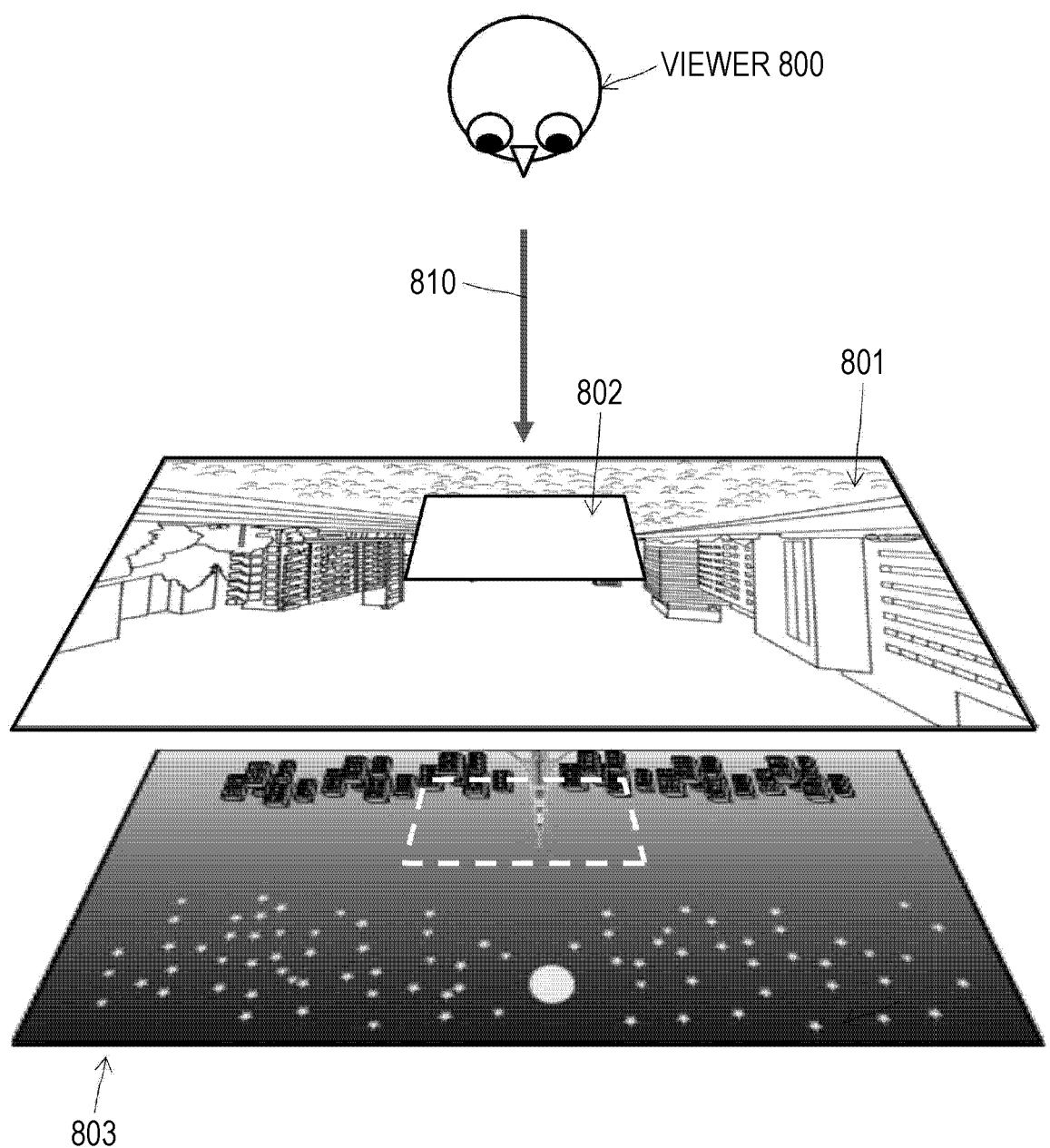
FIG. 8 is a diagram illustrating a state in which a situation where a viewer is seeing sub-content behind through the omni window provided within the main content is looked down from above.

FIG. 8 illustrates a state in which a situation where a viewer 800 is seeing sub-content (free viewpoint space) 803 behind through an omni window 802 provided within display 801 of the main content is looked down from above. However, for the sake of simplifying the drawing, it is assumed that the omni window 802 is made up of only one window and only one piece of the sub-content 803 is looked in therethrough. As illustrated in the drawing, when seeing outside the omni window 802 in a front direction 810, the viewer 800 can observe the scenery of the sub-content (free viewpoint space) 803 visible through the window 802 in the front direction 810 (a portion surrounded by a dotted line in the drawing). However, it is assumed that the video of the sub-content 803 is set to the reproduction position, that is, the viewpoint position and the line-of-sight direction, and the reproduction time determined for the time of display switching from the main content 801, and the line-of-sight direction coincides with the front direction 810. In addition, it is assumed that the sub-content is a moving image and the scenery visible outside the omni window 802 changes from moment to moment.

Figure 9:
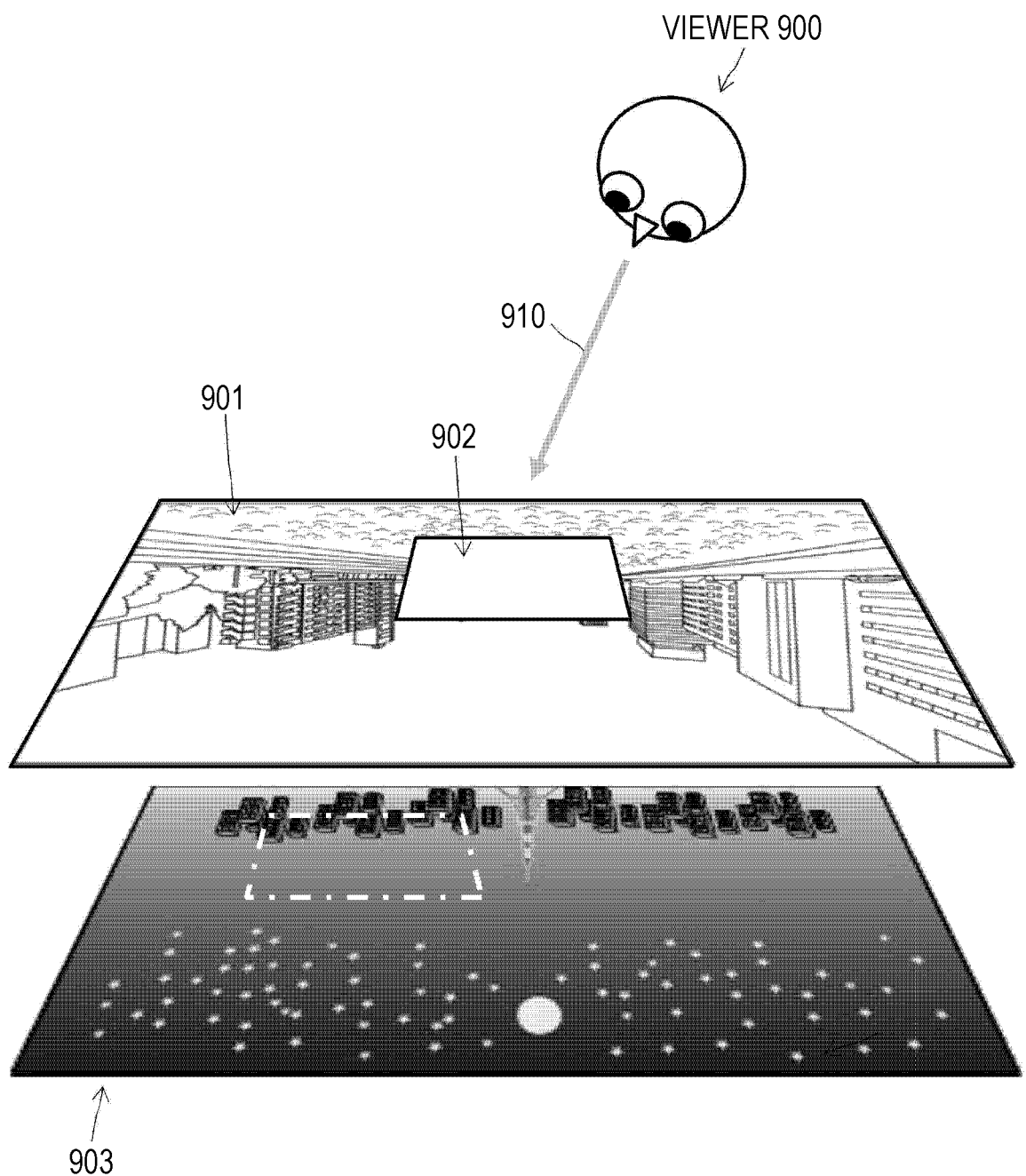
FIG. 9 is a diagram illustrating a state in which a situation where a viewer is seeing the sub-content behind through the omni window provided within the main content is looked down from above.

Meanwhile, FIG. 9 illustrates a state in which a situation where a viewer 900 is seeing sub-content (free viewpoint space) 903 behind through an omni window 902 in a diagonal direction 910 from a location moved to the right from the front in the drawing is looked down from above. As illustrated in the drawing, when seeing outside the omni window 902 in the diagonal direction 910, the viewer 900 can observe the sub-content (free viewpoint space) 903 at the reproduction position, that is, the viewpoint position and the line-of-sight direction, and the reproduction time determined for the case of display switching from the main content 901, as the scenery of the sub-content (free viewpoint space) 903 visible through the omni window 902 in the diagonal direction 910 (a portion surrounded by a one-dot chain line in the drawing). In addition, it is assumed that the sub-content is a moving image and the scenery visible outside the omni window 802 changes from moment to moment (the same as above).

A relative position between the video of the sub-content 903 and the video of the main content 901 ahead thereof (and the omni window 902) is fixed. Accordingly, when the viewpoint position and the line-of-sight direction of the viewer change, the scenery observed through the omni window 902 also changes. For example, when the viewpoint position and the line-of-sight direction of the viewer change as illustrated in FIG. 8 to FIG. 9, the scenery observed through the omni window moves from the location indicated by the dotted line to the location indicated by the one-dot chain line. Accordingly, the omni window is a window opened to look in the sub-content arranged behind the main content and is different from a thumbnail of the sub-content simply pasted on the display screen of the main content 700.

Figure 10:
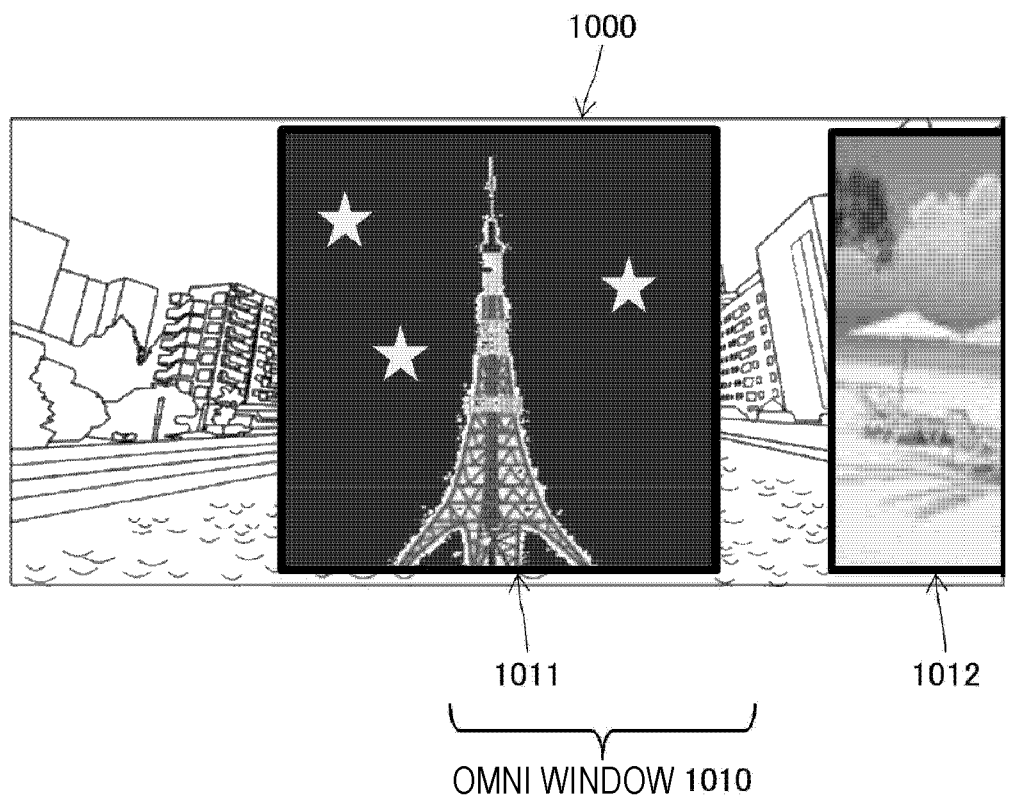
FIG. 10 is a diagram illustrating a display example when a viewer further approaches an omni window 1010 within a free space of the main content.
Figure 11:
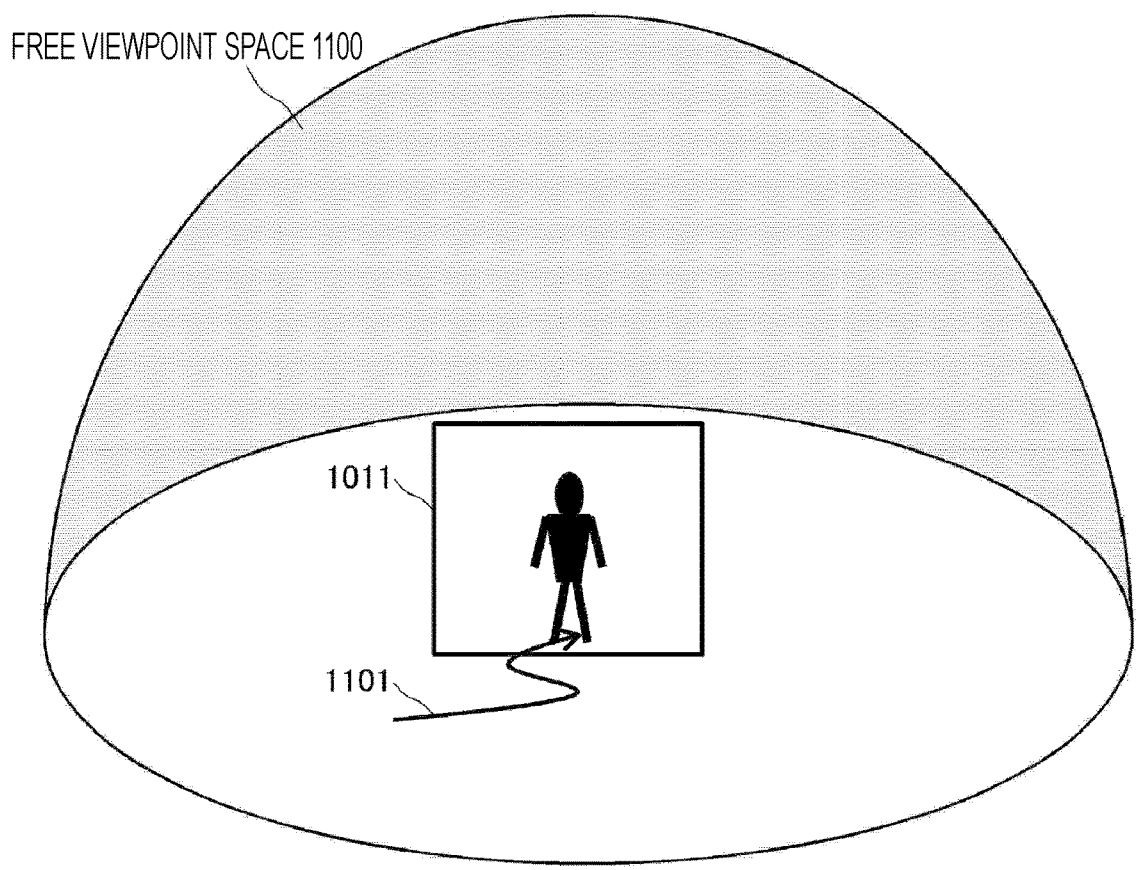
FIG. 11 is a diagram illustrating a state in which a viewer moves a viewpoint position within a free viewpoint space of the main content to pass through a window frame of the omni window.
Figure 12:
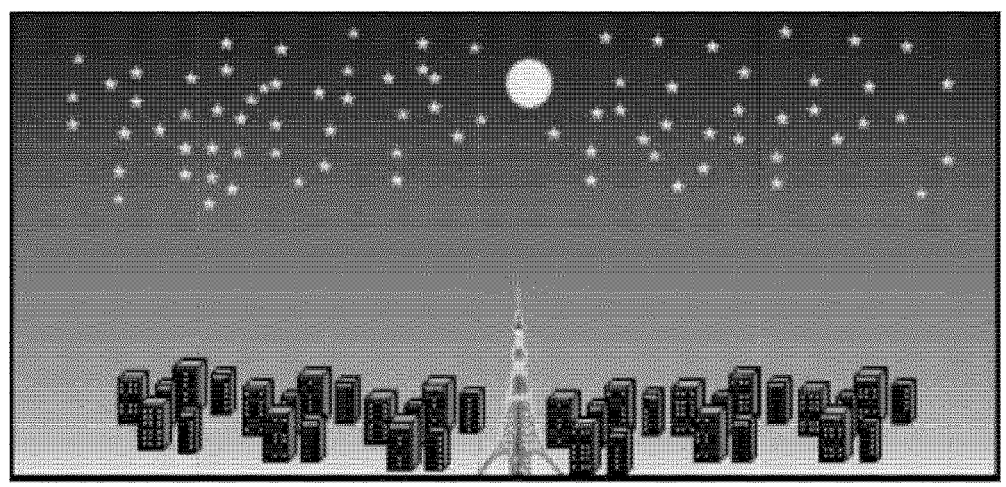
FIG. 12 is a diagram illustrating an example in which display has been switched between the main content and the sub-content.

FIG. 10 illustrates a display example when a viewer further approaches an omni window 1010 within a free space of the main content. As the viewer further approaches the omni window 1010 closer than the situation illustrated in FIG. 7, respective windows 1011 and 1012 gradually become larger in the field of view of the viewer in accordance with distances from the viewpoint position of the viewer to respective windows 1011 and 1012. Then, when the viewer 1101 moves the viewpoint position within a free viewpoint space 1100 of the main content to pass through a window frame of one window, namely, the window 1011 (refer to FIG. 11), as illustrated in FIG. 12, the display of the main content is switched to the sub-content (free viewpoint space) located forward of the window frame passed through. Note that, although illustration is omitted, the display of the main content is similarly switched to the corresponding sub-content (free viewpoint space) also in a case where the window frame of another window, namely, the window 1012 is passed through.

Figure 13:
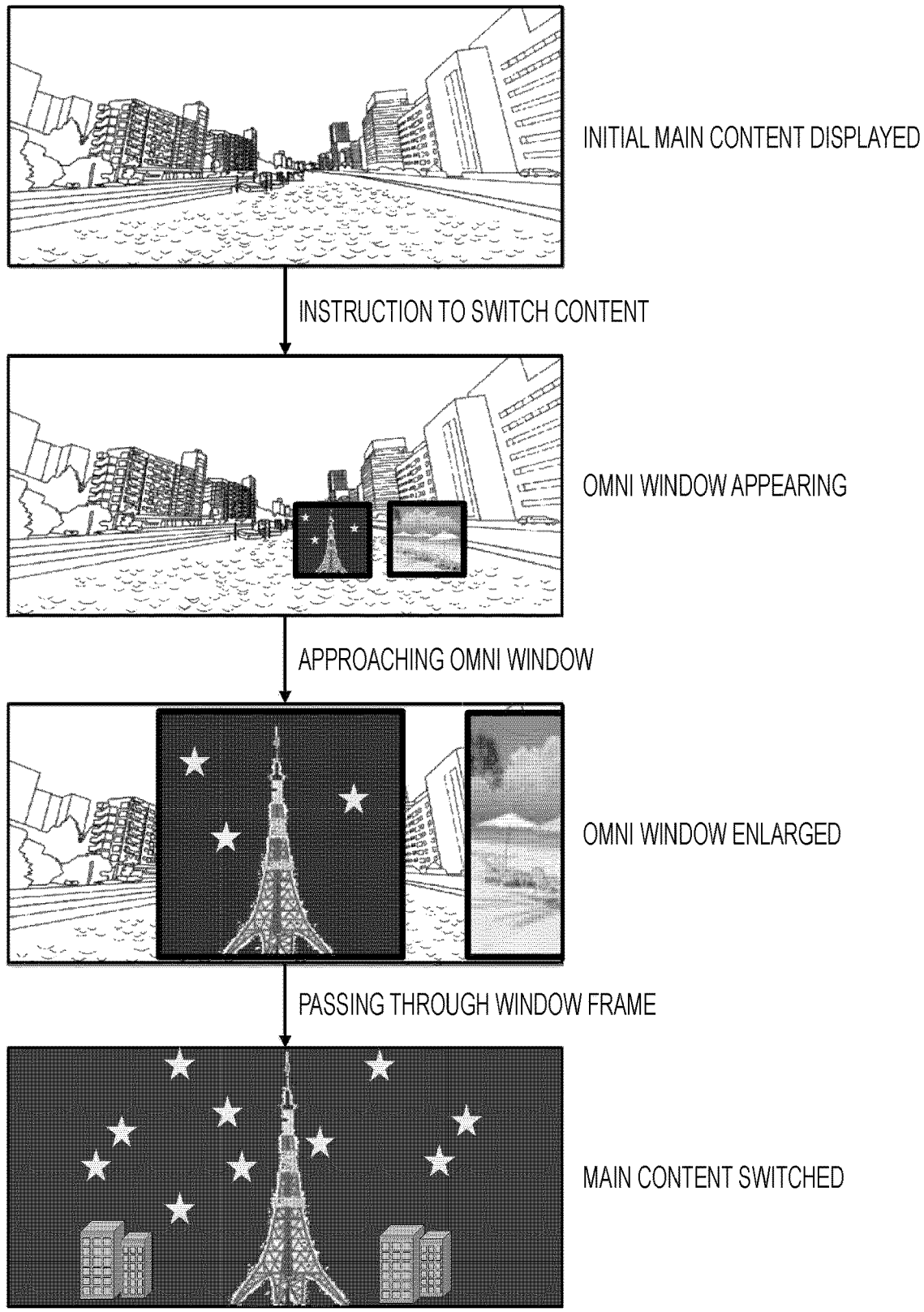
FIG. 13 is a diagram illustrating a screen transition example of display switching of the free viewpoint video content using the omni window.

FIG. 13 summarizes a screen transition example of display switching of the free viewpoint video content using the omni window as described thus far.

It is also possible to impart a conversion function for a perceived size of the viewer in the content (free viewpoint space) of the display switching destination to the window frame of the omni window.

Figure 14:
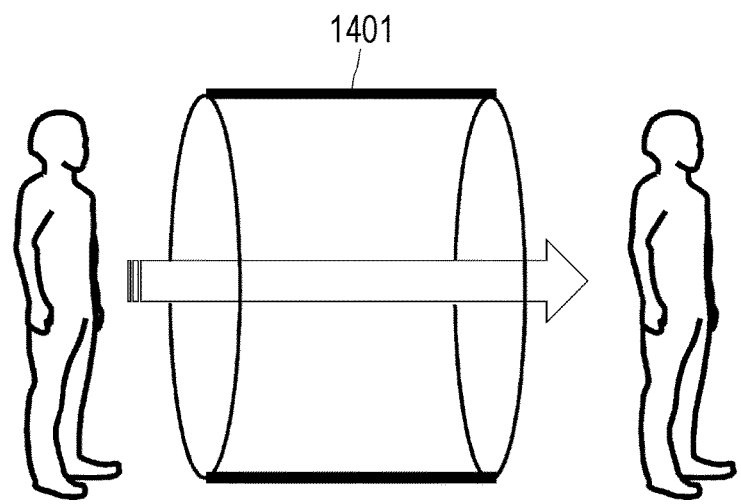
FIG. 14 is a diagram conceptually illustrating an example of switching the display of content using an omni window provided with a conversion function for a perceived size (the case of life-size).

FIG. 14 conceptually illustrates a window frame 1401 of an omni window that switches the content to the next content while keeping the viewer at the life-size (or leaving the original perceived size set in the main content as it is). In addition, FIG. 15 conceptually illustrates a window frame 1501 of an omni window that extends the perceived size of the viewer in the content (free viewpoint space) of the switching destination. In the free viewpoint space located forward of such a window frame 1501 passed through, since the body of the viewer has become larger than before, the viewer perceives the scenery in the switched free viewpoint space as being relatively small. Furthermore, in contrast to the example illustrated in FIG. 15, FIG. 16 conceptually illustrates a window frame 1601 of an omni window that reduces the perceived size of the viewer in the content (free viewpoint space) of the switching destination. In the free viewpoint space located forward of such a window frame 1601 passed through, since the body of the viewer has become smaller than before, the viewer perceives the scenery in the switched free viewpoint space as being relatively large.

Figure 17:
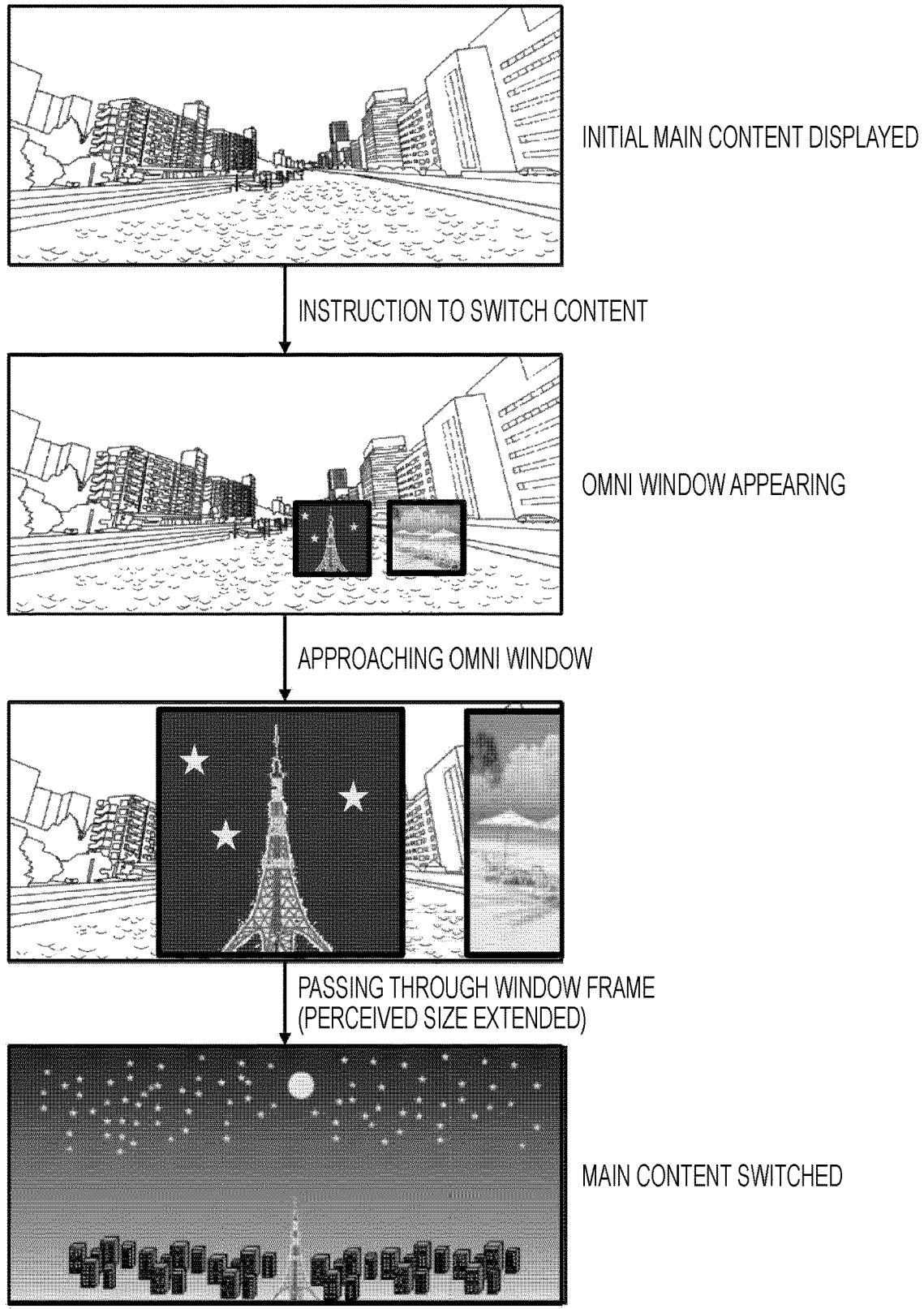
FIG. 17 is a diagram illustrating a screen transition example of display switching of the free viewpoint video content using the conversion function for the perceived size of a viewer.

FIG. 17 illustrates a screen transition example of display switching of the free viewpoint video content using an omni window provided with the conversion function for the perceived size of the viewer. Unlike the screen transition example illustrated in FIG. 13, the perceived size of the viewer in the free viewpoint space of the display switching destination is extended and the viewer perceives the scenery in the free viewpoint space as being relatively small by an amount equivalent to the extension.

Figure 15:
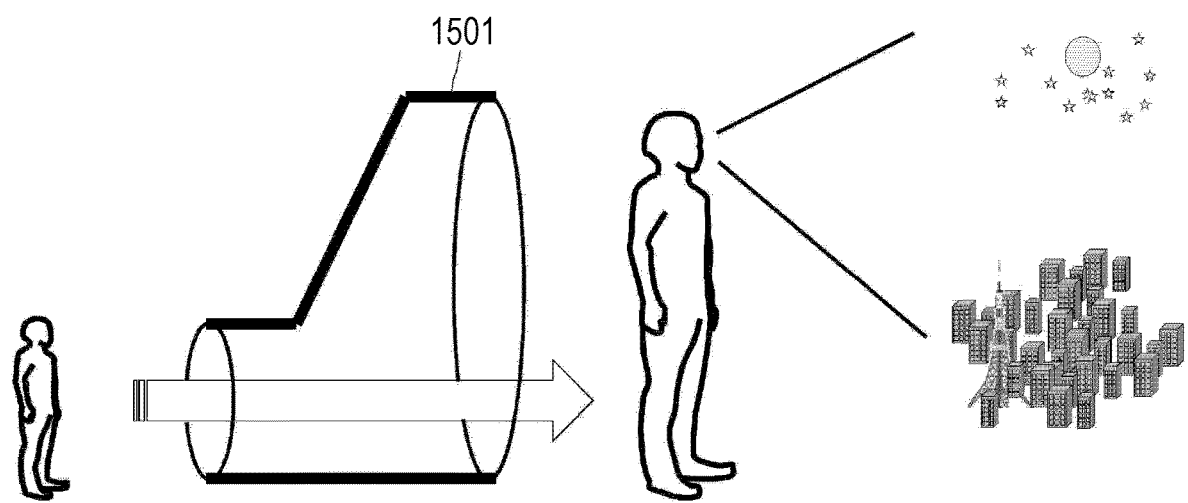
FIG. 15 is a diagram conceptually illustrating an example of switching the display of content using the omni window provided with the conversion function for the perceived size (the case of extending the perceived size).
Figure 16:
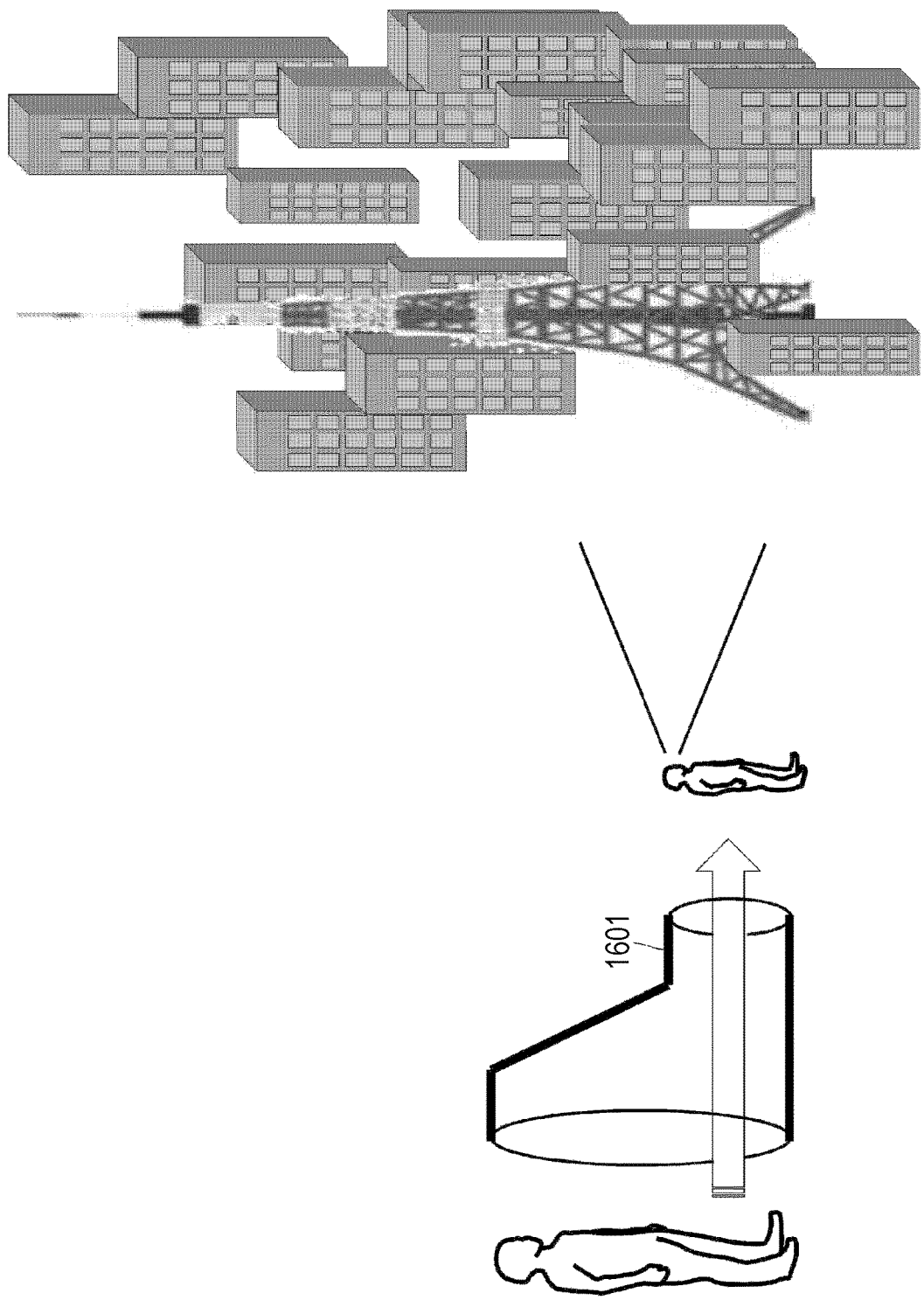
FIG. 16 is a diagram conceptually illustrating an example of switching the display of content using the omni window provided with the conversion function for the perceived size (the case of reducing the perceived size).

The conversion function for the perceived size can be realized, for example, by adapting the height of the viewpoint position and the interpupillary distance of the viewer in the free viewpoint space and performing a rendering process on the free viewpoint video. That is, when the perceived size is extended as illustrated in FIG. 15, by rendering with a heightened viewpoint position and an enlarged interpupillary distance, a free viewpoint video seen by the viewer with a body larger than before is obtained and the viewer perceives the scenery in the free viewpoint space as being relatively small. In addition, when the perceived size is contracted as illustrated in FIG. 16, by rendering with a lowered viewpoint position and a decreased interpupillary distance, a free viewpoint video seen by the viewer with a body smaller than before is obtained and the viewer perceives the scenery in the free viewpoint space as being relatively large. As a matter of course, the method of realizing the conversion function for the perceived size is not limited to this method and another method may be used.

The UI unit 112 may be equipped with an operation unit such as a dial for designating the perceived size of the viewer. Alternatively, the perceived size of the viewer may be designated on the basis of audio input from the viewer such as "larger!" or "smaller!". As a matter of course, the perceived size may be converted not only at the time of display switching of the content but also during the display of the content.

Figure 18:
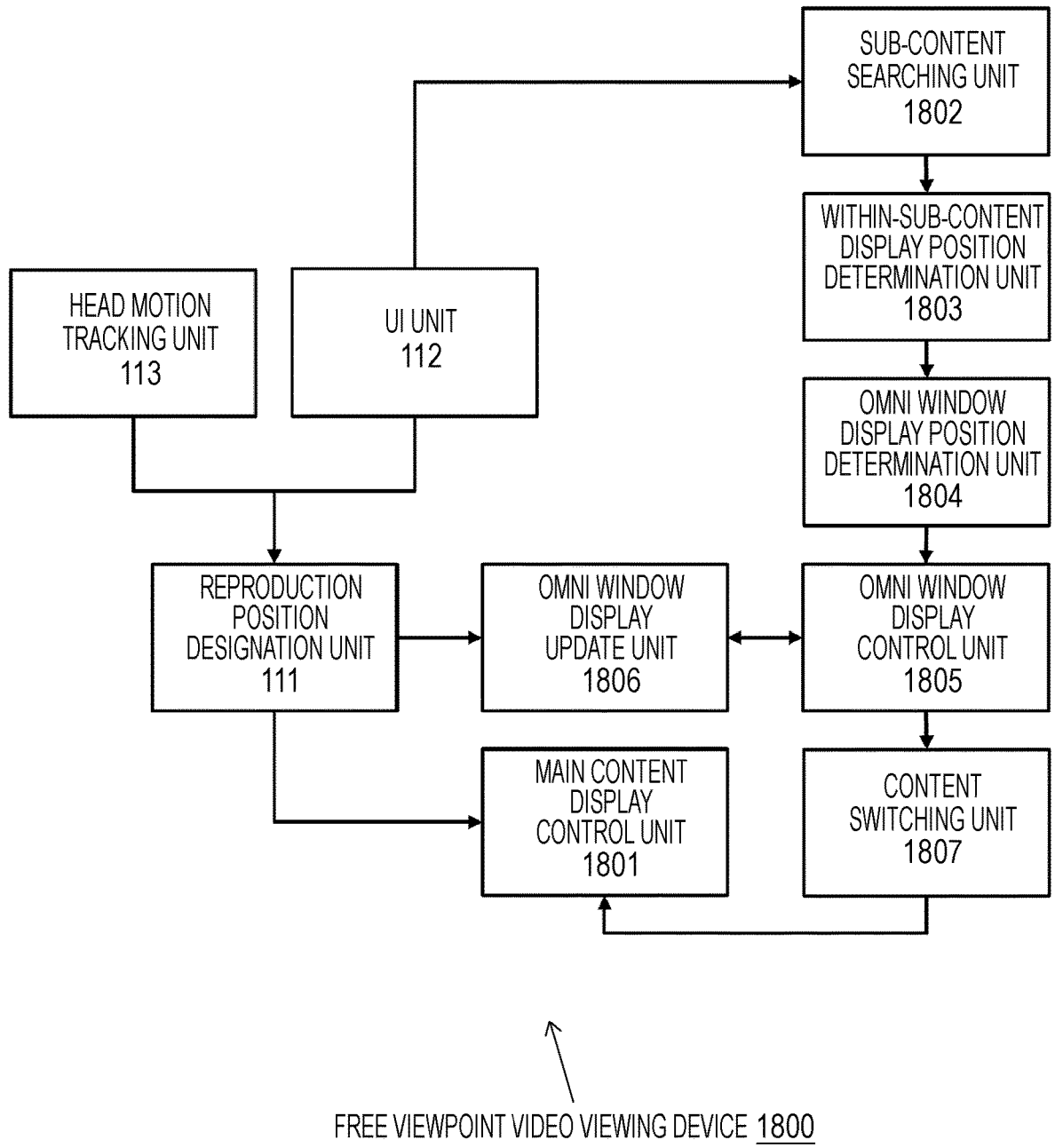
FIG. 18 is a diagram illustrating a functional configuration example of a free viewpoint video viewing device 1800 that realizes display switching of the free viewpoint video content using the omni window.

FIG. 18 illustrates a functional configuration example of a free viewpoint video viewing device 1800 that realizes display switching of the free viewpoint video content using the omni window. This free viewpoint video viewing device 1800 is provided with respective functional blocks, namely, a main content display control unit 1801, a sub-content searching unit 1802, a within-sub-content display position determination unit 1803, an omni window display position determination unit 1804, an omni window display control unit 1805, an omni window display update unit 1806, and a content switching unit 1807. Each functional block can be implemented in either software or hardware form. The entity of the free viewpoint video viewing device 1800 is configured as, for example, a head-mounted display.

The main content display control unit 1801 outputs the free viewpoint video currently set as the main content to the video display unit 116 to display thereon. That is, the main content display control unit 1801 reads, from the video accumulation unit 106, the main content at the reproduction position corresponding to the viewpoint position and the line-of-sight direction, and the time designated by the reproduction position designation unit 111 and outputs the main content to the video display unit 116 to display thereon.

Note that the reproduction position designation unit 111 designates the reproduction position information through the viewer's operation on the UI unit 112 or audio input from the viewer or designates the reproduction position information on the basis of the detection result on the position and the posture of the viewer's head by the head motion tracking unit 112 (described earlier).

When switching to another free viewpoint video is instructed from the viewer, for example, through the UI unit 112, the sub-content searching unit 1802 carries out a search for the sub-content as a candidate for the switching destination from among the free viewpoint video content accumulated in the video accumulation unit 106. The sub-content searching unit 1802 filters numerous pieces of the content in the video accumulation unit 106 on the basis of a predetermined filtering condition and selects a candidate for the switching destination as the sub-content. Detailed description of this process will be given later.

The within-sub-content display position determination unit 1803 determines the reproduction position within the sub-content, that is, the viewpoint position and the line-of-sight direction, and the reproduction time on the supposition that the display is switched to each sub-content selected by the sub-content searching unit 1802, on the basis of a predetermined algorithm. Detailed description of the process for determining the reproduction position in each sub-content will be given later.

The omni window display position determination unit 1804 determines the display position and the display size of the omni window to be displayed on the main content currently being displayed. The omni window is configured by integrating windows through which the free viewpoint space of each sub-content is looked in (described earlier). The omni window display position determination unit 1804 may determine, for example, the display position and the display size of the omni window so as to avoid a characteristic display object within the main content currently being displayed or may determine the display position and the display size as fixed position and size using the current line-of-sight direction of the viewer as a reference.

Then, the omni window display control unit 1805 arranges the omni window within the free viewpoint space of the main content with the display position and the display size determined by the omni window display position determination unit 1804 and displays the free viewpoint video of the sub-content on the video display unit 116 individually through each window in the omni window (for example, refer to FIG. 7). At this time, the omni window display control unit 1805 is assumed to display the sub-content in each window with the reproduction position (that is, the viewpoint position and the line-of-sight direction, and the reproduction time) determined by the within-sub-content display position determination unit 1803.

The free viewpoint space of each sub-content is arranged behind the free viewpoint space of the main content. In addition, the omni window is a window integrating all windows, through each of which each sub-content is looked in from the main content. The omni window display update unit 1806 updates the video of each sub-content visible through the omni window in response to a change in the location of the viewer when looking in through the omni window within the free viewpoint space of the main content (for example, refer to FIGS. 8 and 9). Furthermore, as the viewer approaches the omni window within the free viewpoint space, the omni window display update unit 1806 gradually makes the display of the omni window larger in accordance with the distance from the viewpoint position of the viewer to the omni window (for example, refer to FIG. 10).

When the viewer passes through the window frame of one of the windows in the omni window, the content switching unit 1807 switches the sub-content (free viewpoint space) located forward after passing therethrough to the main content. Then, the main content display control unit 1801 switches the display on the video display unit 116 to the video of the free viewpoint space of the content newly set as the main content (for example, refer to FIG. 13).

In addition, the conversion function for the perceived size of the viewer in the content (free viewpoint space) of the display switching destination can be used in the window frame of the omni window. In a case where the conversion function for the perceived size is used, the content switching unit 1807 instructs the main content display control unit 1801 on the set perceived size (for example, the height of the viewpoint position and the interpupillary distance) when switching the sub-content to the main content. Then, the main content display control unit 1801 performs rendering of the free viewpoint video of the switching destination on the basis of the set perceived size (for example, the height of the viewpoint position and the interpupillary distance) and adjusts the free viewpoint space to be output to the video display unit 116 and displayed thereon to a scenery in accordance with the perceived size.

Figure 19:
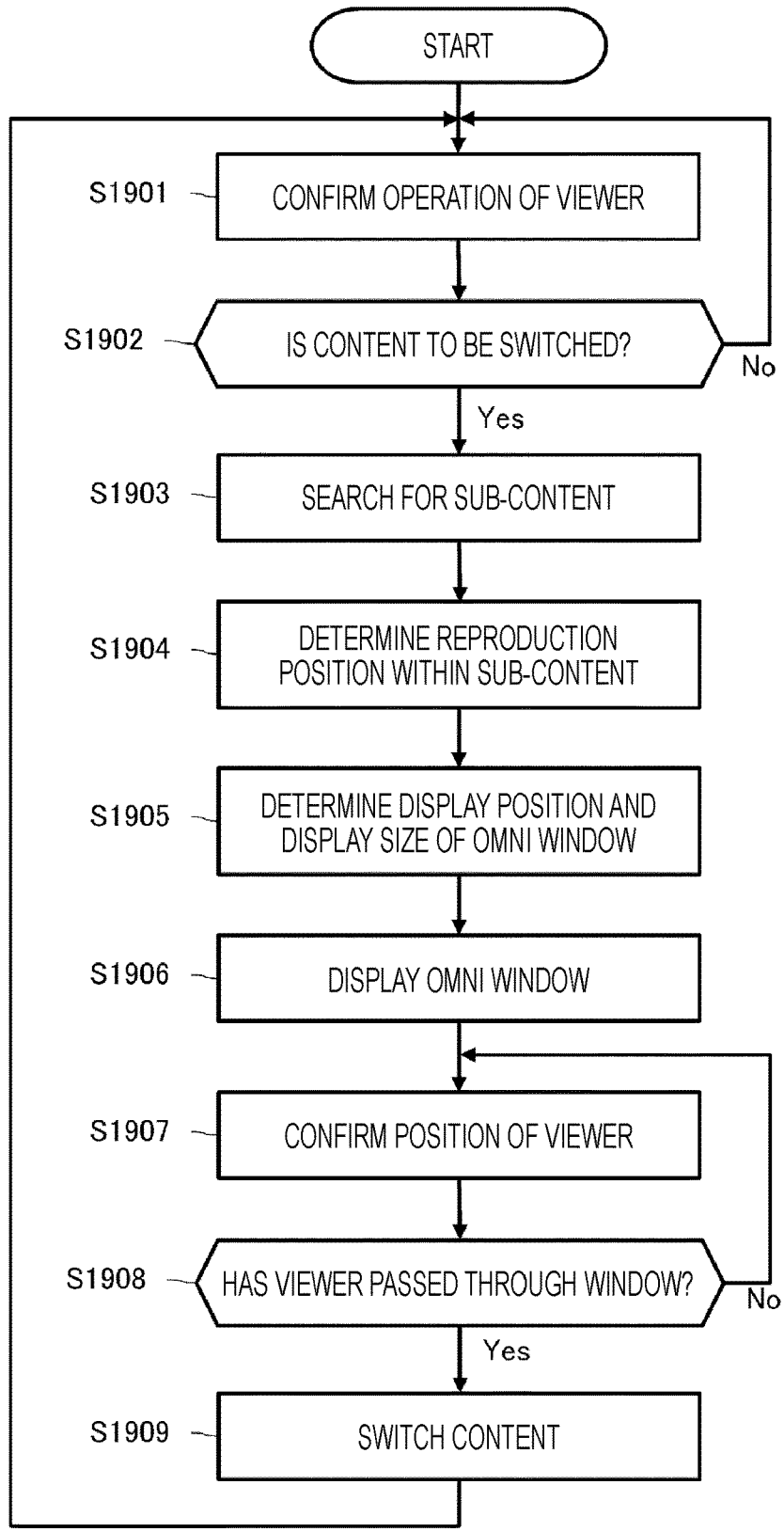
FIG. 19 is a flowchart illustrating a processing procedure for realizing display switching of the free viewpoint video content using the omni window.

FIG. 19 illustrates a processing procedure for realizing display switching of the free viewpoint video content using the omni window in the free viewpoint video viewing device 1800 in the form of a flowchart. The free viewpoint video viewing device 1800 executes this processing procedure while outputting and displaying the free viewpoint video currently set as the main content.

When an operation is performed by the viewer through, for example, the UI unit 112 (step S1901), it is checked whether the operation is an instruction to switch to another free viewpoint video (step S1902).

Then, when switching to another free viewpoint video is instructed (Yes in step S1902), the sub-content searching unit 1802 carries out a search for the sub-content as a candidate for the switching destination from among the free viewpoint video content accumulated in the video accumulation unit 106. Detailed description of the process of selecting the sub-content will be given later.

Next, the within-sub-content display position determination unit 1803 determines the reproduction position within the sub-content, that is, the viewpoint position and the line-of-sight direction, and the reproduction time on the supposition that the display is switched to each sub-content selected by the sub-content searching unit 1802, on the basis of a predetermined algorithm (step S1904). Detailed description of the process for determining the reproduction position in each sub-content will be given later.

In addition, the omni window display position determination unit 1804 determines the display position and the display size of the omni window to be displayed on the main content currently being displayed (step S1905). The omni window display position determination unit 1804 may determine, for example, the display position and the display size of the omni window so as to avoid a characteristic display object within the main content currently being displayed or may determine the display position and the display size as fixed position and size using the current line-of-sight direction of the viewer as a reference.

Then, the omni window display control unit 1805 arranges the omni window within the free viewpoint space of the main content with the display position and the display size determined by the omni window display position determination unit 1804 and displays the free viewpoint video of the sub-content individually through each window in the omni window (step S1906). At this time, the omni window display control unit 1805 is assumed to display the sub-content in each window with the reproduction position (that is, the viewpoint position and the line-of-sight direction, and the reproduction time) determined by the within-sub-content display position determination unit 1803.

While the omni window is being displayed, the content switching unit 1807 constantly monitors the position of the viewer within the free viewpoint space of the main content (step S1907). In addition, the omni window display update unit 1806 updates the video of each sub-content visible through the omni window in response to a change in the location of the viewer when looking in through the omni window within the free viewpoint space of the main content. For example, as the viewer approaches the omni window within the free viewpoint space, the omni window display update unit 1806 gradually makes the display of the omni window larger in accordance with the distance from the viewpoint position of the viewer to the omni window (for example, refer to FIG. 10).

In addition, when the viewer passes through the window frame of one of the windows in the omni window (Yes in step S1908), the content switching unit 1807 switches the sub-content (free viewpoint space) located forward after passing therethrough to the main content (step S1909).

When the content switching unit 1807 carries out content switching, the main content display control unit 1801 switches the display to the video of the free viewpoint space of the content newly set as the main content. In addition, in a case where the conversion function for the perceived size of the viewer in the content (free viewpoint space) of the display switching destination is used in the window frame of the omni window, the content switching unit 1807 instructs the main content display control unit 1801 on the set perceived size (for example, the height of the viewpoint position and the interpupillary distance) when switching the sub-content to the main content. Then, the main content display control unit 1801 performs rendering of the free viewpoint video of the switching destination on the basis of the set perceived size (for example, the height of the viewpoint position and the interpupillary distance) and adjusts the free viewpoint space to a scenery in accordance with the perceived size.

In the search process for the sub-content carried out in step S1903 in the flowchart illustrated in FIG. 19, filtering is performed on the basis of a predetermined filtering condition and a candidate for the switching destination is selected as the sub-content. FIG. 20 summarizes filtering conditions. In the illustrated example, filtering conditions are roughly classified into three types of filtering conditions, namely, a filter according to information within a screen, a filter according to the viewer, and a filter according to a viewing situation.

The filter according to information within a screen determines whether to select as the sub-content in relation to whether a certain feature point or object (for example, the face of a member A in an idol group) is included in the screen.

The filter according to the viewer uses an own log of the viewer who is currently viewing the main content or a log of someone other than the viewer as a filter. Alternatively, a filter according to the attribute of the viewer is used. The attribute mentioned here includes friends, acquaintances, accompanying people (social graph)/experts, viewing history such as viewing similar works, viewing logs in the main content (tendency to watch the same object), others, and profile information such as age and sex.

As the filter according to a viewing situation, viewing time slot, location/area, classification and size of the viewing device, and the like are exemplified.

Figure 21:
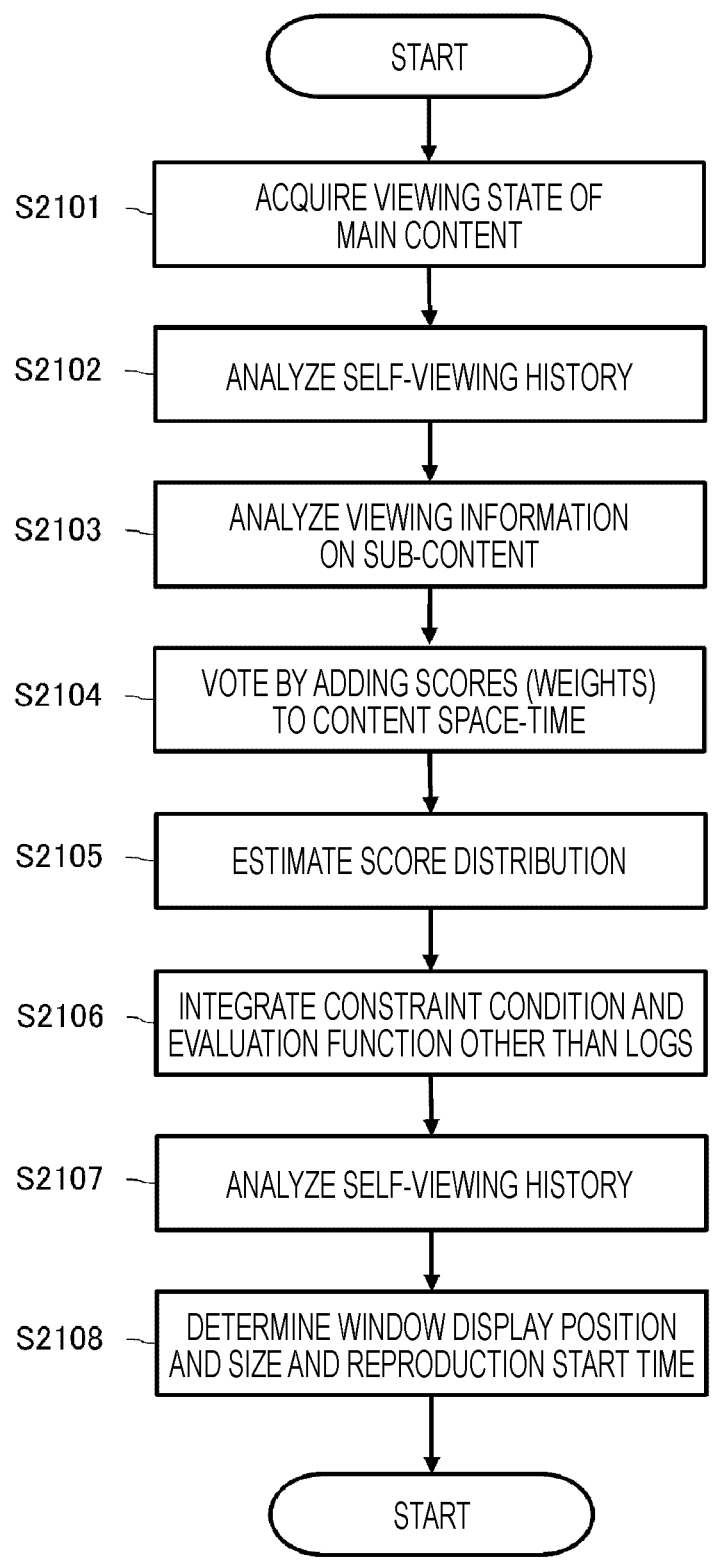
FIG. 21 is a flowchart illustrating a processing procedure for determining a reproduction position within the sub-content.

In addition, FIG. 21 illustrates a processing procedure carried out in step S1904 in the flowchart illustrated in FIG. 19 to determine the reproduction position within the sub-content and the display position and the display size of the omni window in the form of a flowchart.

First, the viewing state of the main content is acquired (step S2101) and information and a filter to be used in filtering for selecting the sub-content are provisionally determined.

Next, a self-viewing history of the viewer is analyzed to analyze the past viewing history of the viewer on the basis of the filter provisionally determined in step S2101 (step S2102) and viewing information and the filter to be used for the next analysis is determined.

Next, viewing information on the sub-content is analyzed (step S2103) to analyze viewing information linked to the content on the basis of the filter provisionally determined in step S2101 and, if the viewing information is valid, the filter and a score (weight) is settled.

Next, a score is given for each information on the basis of the filter determined in step S2103 and a vote is performed by adding scores (weights) to content space-time by unit time, unit space, and unit field of view (step S2104).

Next, a score distribution of a voting result in step S2104 is spatially and temporally estimated (step S2105).

Next, a constraint condition and an evaluation function other than logs are integrated (step S2106) and a contract for restraining a sharp change from the main content to the sub-content and suppression by the evaluation function are performed.

Next, a combination of a maximum score after the constraint is applied in step S2106 and a parameter in that case is calculated (step S2107).

Then, the field of view (the viewpoint position and the line-of-sight direction) and reproduction start time having the maximum score are extracted and the display position and the display size of the omni window are determined depending on a viewing method (step S2108).

INDUSTRIAL APPLICABILITY

The technology disclosed in the present description has been described thus far in detail with reference to specific embodiments. However, it is self-evident that modification and substitution of the embodiments can be made by a person skilled in the art without departing from the spirit of the technology disclosed in the present description.

According to the technology disclosed in the present description, it is possible to switch the display of content so as to alleviate health hazard to viewers without impairing the reality using the omni window.

The present description has focused on the description of the embodiments in which the technology disclosed in the present description is applied to display switching of the free viewpoint video. However, the spirit of the technology disclosed in the present description is not limited thereto. The technology disclosed in the present description can be similarly applied also to the case of switching the display of wide-angle video content or ordinary 3D or 2D video content as well as all-surrounding type content.

In conclusion, the technology disclosed in the present description has been described in a form of examples and the content described in the present description should not be narrowly construed. In order to judge the spirit of the technology disclosed in the present description, claims should be considered.

Furthermore, the technology disclosed in the present description can be configured as follows:

(1) An information processing device including:

an omni window display control unit that controls display of an omni window through which sub-content is looked in from a free viewpoint space of main content currently being displayed; and a content switching unit that switches the sub-content to the main content in response to a motion of a viewer passing through the omni window within the free viewpoint space.

(2) The information processing device according to (1) above, further including a sub-content searching unit that selects the sub-content as a candidate for a display switching destination from the main content currently being displayed.

(3) The information processing device according to (2) above, in which the sub-content searching unit selects the sub-content using at least one of a filter according to information within a screen, a filter according to a viewer, and a filter according to a viewing situation of the main content as a filtering condition.

(4) The information processing device according to any one of (1) to (3) above, further including a within-sub-content display position determination unit that determines a viewpoint position and a line-of-sight direction, and reproduction time within the sub-content of a display switching destination.

(5) The information processing device according to any one of (1) to (4) above, further including an omni window display position determination unit that determines a position and a size of the omni window to be displayed on the main content.

(6) The information processing device according to (5) above, in which the omni window display control unit arranges the omni window within the free viewpoint space of the main content with a display position and a display size determined by the omni window display position determination unit and displays a free viewpoint video of the sub-content watchable while being looked in through a window in the omni window.

(7) The information processing device according to any one of (1) to (6) above, further including an omni window display update unit that updates display of the omni window in line with a movement of a viewer within the free viewpoint space of the main content.

(8) The information processing device according to any one of (1) to (7) above, in which the content switching unit converts a perceived size of a viewer when switching the sub-content to the main content.

(9) An information processing method including:

an omni window display step of displaying an omni window through which sub-content is looked in from a free viewpoint space of main content currently being displayed; and a content switching step of switching the sub-content to the main content in response to a motion of a viewer passing through the omni window within the free viewpoint space.

REFERENCE SIGNS LIST

100 Free viewpoint video viewing system
101-1, 101-2, . . . , 101-N Camera
102 Communication interface
103 Video input unit
104 Free viewpoint video generation unit
105 Video encoding unit
106 Video accumulation unit
111 Reproduction position designation unit
112 User interface (UI) unit
113 Head motion tracking unit,
114 Video reading unit
115 Video decoding unit
116 Video display unit
201 Free viewpoint video production device
202 Video server
203 Free viewpoint video viewing device
301 Video server
302 Transmission line
303 Free viewpoint video viewing device
1800 Free viewpoint video viewing device
1801 Main content display control unit
1802 Sub-content searching unit
1803 Within-sub-content display position determination unit
1804 Omni window display position determination unit
1805 Omni window display control unit
1806 Omni window display update unit
1807 Content switching unit

The invention claimed is:

1. An information processing device comprising:
an omni window display control unit that controls display of an omni window having a plurality of windows arranged on a display, each window of the omni-window providing sub-content that can be viewed from a free viewpoint space of main content currently being displayed; and
a content switching unit that switches the main content to the sub-content content in response to a motion of a viewer passing through the omni window within the free viewpoint space, in which the content switching unit converts a perceived size of a viewer when switching the sub-content to the main content by adapting a height of a viewpoint position and a distance of the viewer in the free viewpoint space,
wherein a size of each of the plurality of windows within a field of view of the viewer increases until the main content is switched to the sub-content based on a distance between the viewer and omni window.

2. The information processing device according to claim 1, further comprising a sub-content searching unit that selects the sub-content as a candidate for a display switching destination from the main content currently being displayed.

3. The information processing device according to claim 2, wherein
the sub-content searching unit selects the sub-content using at least one of a filter according to information within a screen, a filter according to a viewer, and a filter according to a viewing situation of the main content as a filtering condition.

4. The information processing device according to claim 1, further comprising a within-sub-content display position determination unit that determines a viewpoint position and a line-of-sight direction, and reproduction time within the sub-content of a display switching destination.

5. The information processing device according to claim 1, wherein
the omni window display control unit arranges the omni window within the free viewpoint space of the main content with a display position and a display size determined by the omni window display position determination unit and displays a free viewpoint video of the sub-content watchable while being looked in through a window in the omni window.

6. The information processing device according to claim 1, further comprising an omni window display update unit that updates display of the omni window in line with a movement of a viewer within the free viewpoint space of the main content.

7. The information processing device according to claim 1, comprising an omni window display position determination unit that determines a position and a size of each of the plurality of windows of the omni window to be displayed on the main content such that as the distance between the viewer and omni window decreases on the display, the size of each of the plurality windows within a field of view of the viewer increases.

8. An information processing method comprising:
displaying an omni window having a plurality of windows arranged on a display, each window of the omni-window providing sub-content that can be viewed from a free viewpoint space of main content currently being displayed;
switching the sub-content to the main content in response to a motion of a viewer passing through the omni window within the free viewpoint space;
converting a perceived size of a viewer when switching the sub-content to the main content by adapting a height of a viewpoint position and a distance of the viewer in the free viewpoint space; and increasing a size of each of the plurality of windows within a field of view of the viewer increases until the main content is switched to the sub-content based on a distance between the viewer and omni window.

9. The information processing device according to claim 1, wherein the score is generated by adding scores associated respectively with each of the unit of time, unit of space and unit of field of view.

10. The information processing device according to claim 1, further comprising a user interface for designating the perceived size of the user.

11. The information processing device according to claim 1, wherein a reproduction position within the sub-content is determined based on an analysis of past viewing history associated with the viewer to determine viewing information and generating a score associated with the viewing information on the basis of a unit of time, unit of space and unit of field of view.

12. The information processing method according to claim 8, comprising determining a reproduction position within the sub-content based on an analysis of past viewing history associated with the viewer to determine viewing information and generating a score associated with the viewing information on the basis of a unit of time, unit of space and unit of field of view.

13. The information processing method according to claim 8, comprising determining a position and a size of each of the plurality of the omni window to be displayed on the main content such that as the distance between the viewer and omni window decreases on the display, a size of each the plurality of windows within a field of view of the viewer increases.

* * * * *